US012056212B2

(12) United States Patent
Virodov et al.

(10) Patent No.: US 12,056,212 B2
(45) Date of Patent: *Aug. 6, 2024

(54) METHODS AND SYSTEMS FOR GENERATING COMPOSITE IMAGE DESCRIPTORS

(71) Applicant: Verizon Patent and Licensing Inc., Basking Ridge, NJ (US)

(72) Inventors: Sergey Virodov, San Diego, CA (US); Vinaya Kumar Polavarapu, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/897,741

(22) Filed: Aug. 29, 2022

(65) Prior Publication Data

US 2022/0414393 A1 Dec. 29, 2022

Related U.S. Application Data

(63) Continuation of application No. 17/167,846, filed on Feb. 4, 2021, now Pat. No. 11,461,578.

(51) Int. Cl.
*G06K 9/00* (2022.01)
*G06F 18/211* (2023.01)
(Continued)

(52) U.S. Cl.
CPC ............ *G06F 18/22* (2023.01); *G06F 18/211* (2023.01); *G06F 18/2113* (2023.01);
(Continued)

(58) Field of Classification Search
CPC ...... G06V 10/22; G06V 10/225; G06V 10/23; G06V 10/36; G06V 10/40; G06V 10/42; G06V 10/422; G06V 10/44; G06V 10/46; G06V 10/462; G06V 10/464; G06V 10/467; G06V 10/50; G06V 10/513; G06V 10/70; G06V 10/72; G06V 10/74; G06V 10/751; G06V 10/757; G06V 10/758; G06V 10/761; G06V 10/762; G06V 10/7625; G06V 10/763; G06V 10/768; G06V 10/77; G06V 10/771; G06V 10/80; G06V 10/803;
(Continued)

(56) References Cited

U.S. PATENT DOCUMENTS

| 4,135,147 A * | 1/1979 | Riganati | ............... G06V 10/40 |
| | | | 382/209 |
| 8,144,947 B2 | 3/2012 | Kletter | |

(Continued)

*Primary Examiner* — Eric Rush

(57) ABSTRACT

An illustrative image descriptor generation system determines a subset of image descriptors from a plurality of image descriptors that each correspond to a different feature point included within an image. The subset of image descriptors is determined based on geometric proximity, within the image, of respective feature points of the subset of image descriptors to a feature point of a primary image descriptor. The image descriptor generation system then selects a secondary image descriptor from the subset of image descriptors and combines the primary image descriptor and the secondary image descriptor to form a composite image descriptor. Corresponding methods and systems are also disclosed.

20 Claims, 11 Drawing Sheets

(51) Int. Cl.
  *G06F 18/2113* (2023.01)
  *G06F 18/22* (2023.01)
  *G06F 18/25* (2023.01)
  *G06V 10/22* (2022.01)
  *G06V 10/40* (2022.01)
  *G06V 10/46* (2022.01)
  *G06V 10/771* (2022.01)
  *G06V 10/80* (2022.01)
  *G06V 20/00* (2022.01)
  *G06V 20/20* (2022.01)
  *G06V 30/18* (2022.01)

(52) U.S. Cl.
  CPC ............ *G06F 18/253* (2023.01); *G06V 10/23* (2022.01); *G06V 10/40* (2022.01); *G06V 10/46* (2022.01); *G06V 10/464* (2022.01); *G06V 10/771* (2022.01); *G06V 10/806* (2022.01); *G06V 20/00* (2022.01); *G06V 20/20* (2022.01); *G06V 30/18152* (2022.01); *G06T 2207/20021* (2013.01)

(58) Field of Classification Search
  CPC ...... G06V 10/806; G06V 20/00; G06V 20/20; G06V 20/46; G06V 20/60; G06V 20/64; G06V 30/18; G06V 30/1801; G06V 30/18133; G06V 30/18143; G06V 30/18152; G06V 30/1819; G06V 30/19013; G06V 40/12; G06V 40/1335; G06V 40/1347; G06V 40/168; G06V 40/169; G06V 40/171; G06F 18/00; G06F 18/21; G06F 18/211; G06F 18/2113; G06F 18/2115; G06F 18/213; G06F 18/22; G06F 18/23; G06F 18/231; G06F 18/25; G06F 18/251; G06F 18/253; G06F 18/28; G06T 2207/20012; G06T 2207/20021; G06T 2207/20164
  USPC ........ 382/103, 115–118, 124, 125, 168, 170, 382/181, 190–192, 195–197, 199, 201, 382/203, 205, 206, 209, 217–219, 224, 382/225, 229, 230, 243, 251, 278, 282, 382/291, 305, 306, 308
  See application file for complete search history.

(56) References Cited

U.S. PATENT DOCUMENTS

| | | | |
|---|---|---|---|
| 9,349,180 | B1 | 5/2016 | Ramaswamy |
| 9,424,461 | B1 | 8/2016 | Yuan et al. |
| 9,443,164 | B2 * | 9/2016 | Sulc ............... G06V 10/757 |
| 9,754,151 | B2 | 9/2017 | Chen et al. |
| 11,062,460 | B2 | 7/2021 | Liu et al. |
| 11,676,018 | B2 * | 6/2023 | Lee .................. G06V 10/82 |
| | | | 382/190 |
| 2012/0011119 | A1 * | 1/2012 | Baheti .............. G06V 10/771 |
| | | | 707/E17.014 |
| 2016/0148074 | A1 * | 5/2016 | Jean ................. G06V 10/462 |
| | | | 382/190 |
| 2017/0185821 | A1 * | 6/2017 | Chen ............... G06V 40/1353 |
| 2017/0316269 | A1 * | 11/2017 | Bailer .............. G06V 20/48 |
| 2018/0173920 | A1 * | 6/2018 | Jonsson ........... G06V 10/462 |
| 2019/0197133 | A1 * | 6/2019 | Biswas ............. G06V 10/462 |
| 2019/0362179 | A1 * | 11/2019 | Ben Himane ..... G06V 10/771 |

* cited by examiner

Raw Proximity Listing

| Primary Image Descriptor Index | Secondary Image Descriptor Index | Geometric Distance | Similarity |
|---|---|---|---|
| ... | ... | ... | ... |
| 5 | 3 | 10 | 5 |
| 5 | 9 | 9 | 2 |
| 5 | 2 | 21 | 18 |
| 5 | 6 | 12 | 4 |
| 5 | 10 | 25 | 2 |
| 5 | 13 | 23 | 6 |
| 5 | 4 | 14 | 16 |
| ... | ... | ... | ... |

Fig. 6

Composite Image Descriptors

| Primary Image Descriptor Index | Secondary Image Descriptor Index | Primary Image Descriptor Data | Secondary Image Descriptor Data | Composite Image Descriptor Data |
|---|---|---|---|---|
| ... | ... | ... | ... | ... |
| 5 | 6 | 0x555555 | 0x666666 | 0x5555556666666 |
| 5 | 3 | 0x555555 | 0x333333 | 0x5555555333333 |
| 5 | 4 | 0x555555 | 0x444444 | 0x5555555444444 |
| ... | ... | ... | ... | ... |

Fig. 9

METHODS AND SYSTEMS FOR GENERATING COMPOSITE IMAGE DESCRIPTORS

RELATED APPLICATIONS

This application is a continuation application of U.S. patent application Ser. No. 17/167,846, filed Feb. 4, 2021, and titled "Methods and Systems for Generating Composite Image Descriptors," which is hereby incorporated by reference in its entirety.

BACKGROUND INFORMATION

There is a massive amount of visual data (e.g., photographs and other types of images, videos, etc.) available and being generated today, and the amount of visual data continues to increase. All this visual data must be managed (e.g., analyzed, organized, classified, indexed for search, stored and maintained, etc.) in various ways for the data to be useful, but certain challenges arise when managing visual data that may not arise to the same extent with other types of data (e.g., textual data). For example, while it is relatively straightforward to compare a textual search term with textual data included within a data source being searched, it is not trivial to identify uniformity or similarity between images, even for images that are nearly identical. Two images depicting identical subject matter from a same vantage point at consecutive points in time (e.g., photos taken a second apart by the same camera) may be considered as one example. These images may look identical to a human viewer but, due to subtle changes in lighting, imperceptible movement in the scene (e.g., grass swaying, etc.), and or other minor differences, these images may be represented by datasets that are not immediately recognizable to a computer as having any relationship.

To address these challenges, image descriptors (also referred to as visual descriptors) have been developed. Image descriptors may objectively and consistently describe content depicted by images (e.g., still images, videos, etc.) to facilitate data management tasks such as those mentioned above. For example, image descriptors may include data representative of visual features (e.g., elementary image characteristics such as shape, color, texture, motion, etc.) of subject matter depicted by images. In these ways, image descriptors may greatly facilitate management of visual data.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 6 shows an illustrative proximity listing that includes additional data for certain pairs of geometrically proximate image descriptors from the proximity listing of FIG. 5 according to embodiments described herein.

FIG. 9 shows an illustrative generating of composite image descriptors for the filtered and sorted proximity listing of FIG. 8 according to embodiments described herein.

DETAILED DESCRIPTION OF EXAMPLE EMBODIMENTS

Figure 1:
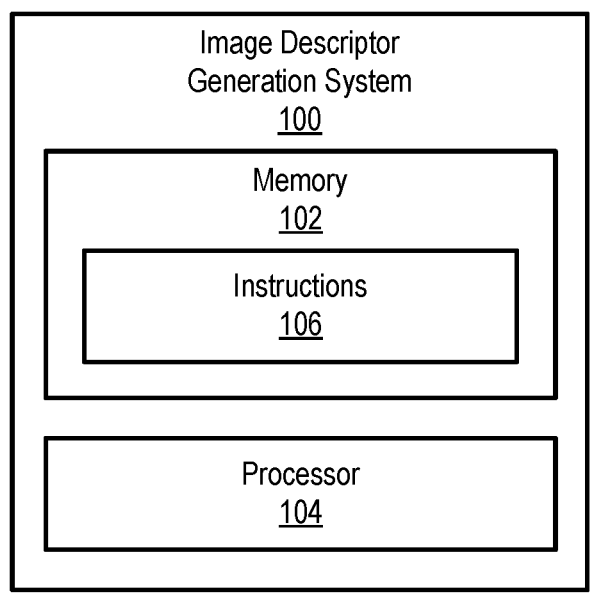
FIG. 1 shows an illustrative image descriptor generation system configured to generate composite image descriptors according to embodiments described herein.

Methods and systems for generating composite image descriptors are described herein. As described above, image descriptors have been developed for use in managing visual data. For example, image descriptors representative of a particular target object may be used to analyze a particular image to determine if that target object is depicted in the image, to search a database of visual data to find images in which that target object is depicted, or the like. Because the information represented in image descriptors is necessarily limited in scope, it is possible that false positive matches can occur when image descriptors are used for matching image content. For instance, an object recognition process will be considered that analyzes an image against a number of predetermined human targets (e.g., particular people such as known friends and acquaintances of a user) to tag the image with the recognized individuals found in the image. If there are ten or even one hundred human subjects that are to be targeted by this process (e.g., searched for in an image being tagged), conventional image descriptors may operate effectively and produce an acceptable number of false positive matches. If, however, such a process were to be used to identify one thousand or one million human targets, conventional image descriptors may be likely to produce an unacceptably large quantity or percentage of false positive matches as the system attempts to search images against this large number of potential targets.

To address these limitations of conventional image descriptors (especially for situations in which there are relatively large numbers of targets being searched, tagged, etc.), methods and systems described herein for generating composite image descriptors create what are referred to herein as "composite image descriptors." As described herein, composite image descriptors may be formed by strategically combining pairs (or larger groupings) of image descriptors to thereby generate more detailed and unique image descriptors with a greater ability than the original image descriptors to differentiate between the types of similar and easily-mismatched targets likely to be present when a searchable data source includes a large number of targets (e.g., thousands, millions, or more targets).

There are various use cases where the information density of conventional image descriptors may be insufficient to identify targets to a desired standard of accuracy, and where methods and systems described herein for generating composite image descriptors may be beneficial. For instance, in addition to examples mentioned above, methods and systems described herein may be highly beneficial in augmented reality applications and other types of extended reality use cases in which streaming real-world imagery (e.g., from a camera of a mobile device) is to be analyzed, and targets (e.g., recognized objects that are to be augmented or replaced within the augmented reality world) are to be found in real time. As one specific example, a particular augmented reality service (e.g., a mobile application, etc.) may be configured to find two-dimensional ("2D") art printed on magazines, newspapers, music albums, or the like, and may augment this content by animating it (e.g., bringing imagery on a magazine cover to life), replacing it with other information (e.g., advertisements, informational facts, etc.), or the like. This type of application may be configured to search for thousands or millions of different content instances (e.g., 2D images found on various types of media) present in the real world. Hence, composite image descriptors may be useful to allow this type of application to successfully differentiate between the thousands of potential content instances that may be present in a searchable database.

Similar examples may also be well served by methods and systems described herein for generating composite image descriptors. For instance, targets including various other types of 2D images and objects (e.g., movie posters, billboards and other advertisements such as printed on the sides of buses or buildings, currency notes, etc.), as well as various 3D images and objects (e.g., specific makes and models of vehicles; specific individuals such as celebrities, individuals registered with a particular dating service, or suspected criminals on a security watch list; etc.) may also be analyzed more accurately and reliably using composite image descriptors described herein.

While it could be theoretically possible to combine each image descriptor for a particular image with every other image descriptor for the image to generate a large number of composite image descriptors, this type of approach would likely be wasteful, inefficient, and impractical using available computing resources. For example, a particular image may include several hundred image descriptors associated with various feature points (e.g., corner points, etc.) depicted in the image, and creating a composite image descriptor for every possible combination of these image descriptors would involve creating tens or hundreds of thousands of composite image descriptors for the image (i.e., $N^2$ composite image descriptors for N (e.g., several hundred) primary image descriptors that are initially generated).

Accordingly, as will be made apparent in the description below, methods and systems described herein are configured to strategically select and filter pairs of image descriptors so as to generate a limited number of composite image descriptors (e.g., M*N composite image descriptors for an image with N identified feature points, where M is a relatively small integer such as 1, 3, 5, 10, etc.). In examples in which the number of original, non-composite image descriptors (e.g., the number of feature points) is considered to be sufficient, each primary image descriptor may be matched with exactly one secondary image descriptor to form a single composite image descriptor to replace the non-composite image descriptor (and thereby leave the total quantity of image descriptors the same). In certain examples, however, it may be advantageous to generate more composite image descriptors than there are non-composite image descriptors and identified feature points. In these examples, system 100 may therefore select (e.g., based on a proximity listing such as will be described below) one or more additional image descriptors ("secondary image descriptors") from a subset of prospective secondary image descriptors identified for each primary image descriptor, and may combine the primary image descriptor with each of the one or more additional image descriptors to form a plurality of composite image descriptors for the primary image descriptor. Examples of creating a plurality of composite image descriptors for a single primary image descriptor will be described in more detail below.

Methods and systems described herein for generating composite image descriptors may provide various benefits and advantages for any of the applications or use cases described herein or for other applications and use cases that will be recognized by those of skill in the art. For example, the uniqueness (i.e., ability to differentiate) provided by composite image descriptors described herein may be orders of magnitude greater than the uniqueness that conventional image descriptors would be able to provide (e.g., akin to an accuracy gain between a single precision float value and a double precision float value). As such, thousands or millions of targets may be accurately and reliably analyzed, searched, and identified within images, and the operability of various types of applications (e.g., augmented reality applications that will be described in more detail below, as well as other applications mentioned herein or as may be identified by those of skill in the art) may be significantly improved.

Various specific embodiments will now be described in detail with reference to the figures. It will be understood that the specific embodiments described below are provided as non-limiting examples of how various novel and inventive principles may be applied in various situations. Additionally, it will be understood that other examples not explicitly described herein may also be captured by the scope of the claims set forth below. Methods and systems described herein for generating composite image descriptors may provide any of the benefits mentioned above, as well as various additional and/or alternative benefits that will be described and/or made apparent below.

FIG. 1 shows an illustrative image descriptor generation system 100 ("system 100") configured to generate composite image descriptors in accordance with principles described herein. System 100 may be implemented by computer resources such as processors, memory facilities, storage facilities, communication interfaces, and so forth. For example, system 100 may be implemented by computing systems such as user equipment ("UE") devices (e.g., smartphones, tablet devices, personal computers, extended reality player devices or other media player devices, etc.) operated by a user, distributed computing systems operated by a communications provider (e.g., multi-access edge computing ("MEC") servers), distributed computing systems operated by a cloud-computing provider (e.g., multi-access cloud servers), or any other suitable computing system or systems.

As shown, system 100 may include, without limitation, a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 may also be included within system 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104. Memory 102 may be implemented by one or more memory or storage devices, including any memory or storage devices described herein, that are configured to store data in a transitory or non-transitory manner. Instructions 106 may be executed by processor 104 to cause system 100 to perform any of the functionality described herein. Instructions 106 may be implemented by any suitable application, software, script, code, and/or other executable data instance. Additionally, memory 102 may also maintain any other data accessed, managed, used, and/or transmitted by processor 104 in a particular implementation.

Processor 104 may be implemented by one or more computer processing devices, including general purpose processors (e.g., central processing units (CPUs), graphics processing units (GPUs), microprocessors, etc.), special purpose processors (e.g., application-specific integrated circuits (ASICs), field-programmable gate arrays (FPGAs), etc.), or the like. Using processor 104 (e.g., when processor 104 is directed to perform operations represented by instructions 106 stored in memory 102), system 100 may perform functions associated with generating composite image descriptors as described herein and/or as may serve a particular implementation.

Figure 2:
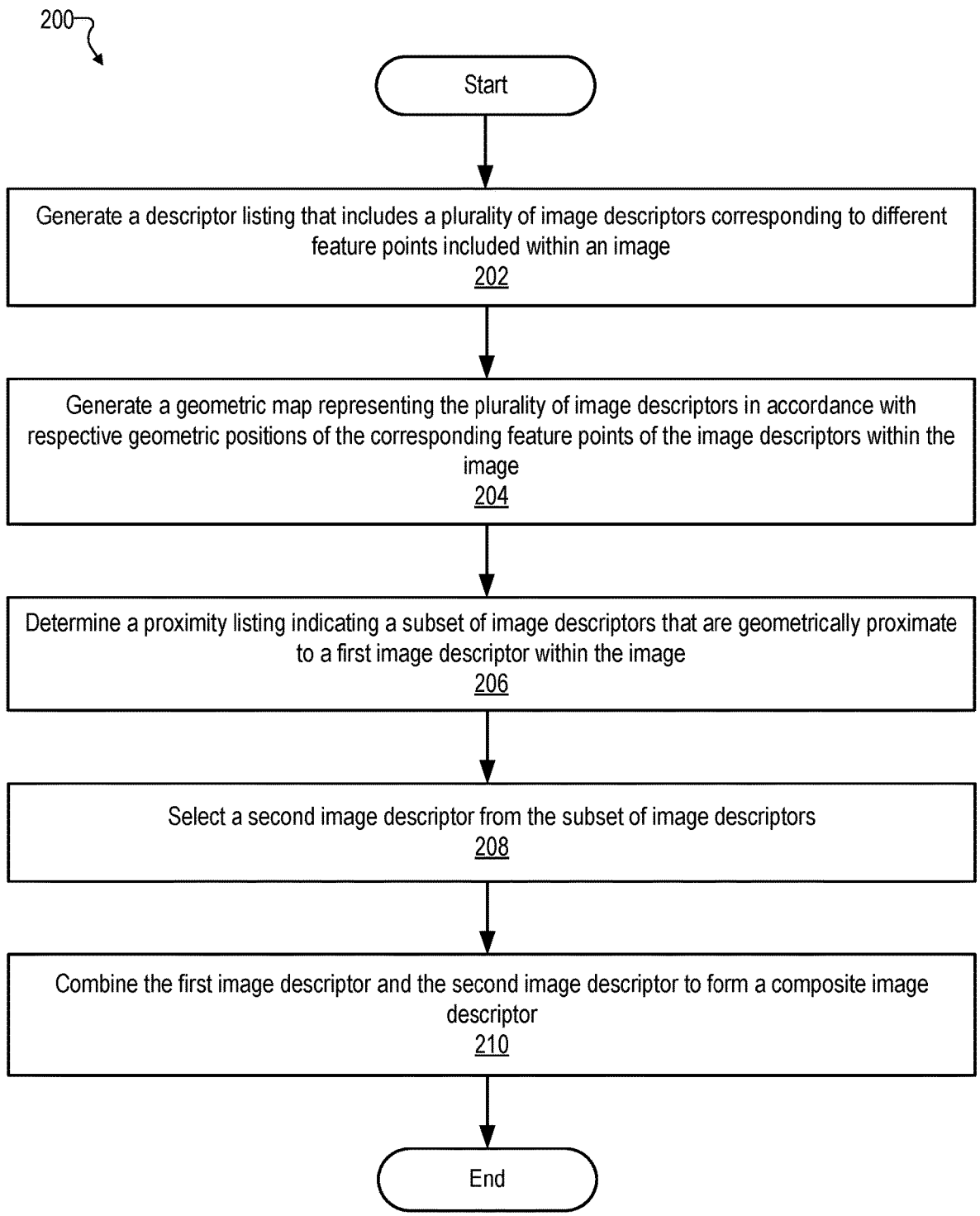
FIG. 2 shows an illustrative method for generating composite image descriptors according to embodiments described herein.

As one example of functionality that processor 104 may perform, FIG. 2 shows an illustrative method 200 for generating composite image descriptors in accordance with principles described herein. While FIG. 2 shows illustrative operations according to one embodiment, other embodiments may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by an image descriptor generation system such as system 100 and/or any implementation thereof.

In some examples, the operations of FIG. 2 may be performed in real time so as to provide, receive, process, and/or use data described herein immediately as the data is generated, updated, changed, exchanged, or otherwise becomes available. Moreover, certain operations described herein may involve real-time data, real-time representations, real-time conditions, and/or other real-time circumstances. As used herein, "real time" will be understood to relate to data processing and/or other actions that are performed immediately, as well as conditions and/or circumstances that are accounted for as they exist in the moment when the processing or other actions are performed. For example, a real-time operation may refer to an operation that is performed immediately and without undue delay, even if it is not possible for there to be absolutely zero delay. Similarly, real-time data, real-time representations, real-time conditions, and so forth, will be understood to refer to data, representations, and conditions that relate to a present moment in time or a moment in time when decisions are being made and operations are being performed (e.g., even if after a short delay), such that the data, representations, conditions, and so forth are temporally relevant to the decisions being made and/or the operations being performed.

Each of operations 202-210 of method 200 will now be described in more detail as the operations may be performed by system 100 (e.g., by processor 104 as processor 104 executes instructions 106 stored in memory 102).

At operation 202, system 100 may generate a descriptor listing based on an image. For instance, in the example of an augmented reality application, the image may be a photograph captured in real time by a camera or other capture device associated with system 100 (e.g., a camera included within an augmented reality player device that implements system 100, etc.). The descriptor listing may include a plurality of image descriptors, arranged within the listing in an arbitrary order, that each correspond to different feature points included within the image. For example, as will be described and illustrated in more detail below, the feature points to which the image descriptors correspond may be corner points (e.g., Harris corners, etc.) and/or other points of interest detected within the image by a feature extraction algorithm. For many images, such a feature extraction algorithm may identify dozens, hundreds, or more feature points within the image. Accordingly, for such examples, the descriptor listing may include an equal number (e.g., dozens, hundreds, etc.) of image descriptors within the plurality of image descriptors.

At operation 204, system 100 may generate a geometric map based on the descriptor listing generated at operation 202. As will be described and illustrated in more detail below, the geometric map may represent the plurality of image descriptors of the descriptor listing in accordance with respective geometric positions of the corresponding feature points of the image descriptors within the image. More specifically, the geometric map may define or clarify spatial relationships between image descriptors that are arbitrarily ordered within the descriptor listing and otherwise do not have any defined geometric relationship (other than being included within the same image). For example, as will be described and illustrated in more detail below, a plurality of bins associated with the image (e.g., bins arranged in rows and columns so as to each be associated with groupings of pixels of the image) may be defined and each image descriptor may be assigned to a particular one of these bins based on the geometric location of the feature point that corresponds to the image descriptor.

At operation 206, system 100 may determine a proximity listing for one or more of the image descriptors within the plurality of image descriptors based on the geometric map generated at operation 204. For example, as will be described and illustrated in more detail below, the proximity listing for one particular image descriptor (a "primary" image descriptor) may indicate a subset of other image descriptors (from the plurality of image descriptors) that are geometrically proximate to the primary image descriptor within the image. If the primary image descriptor corresponds to a feature point geometrically located near the top-left corner of the image, for example, the proximity listing for this primary image descriptor may indicate other image descriptors whose corresponding feature points are likewise near the top-left corner of the image (while omitting, for instance, image descriptors whose corresponding feature points are not proximate to the feature point of the primary image descriptor, such as image descriptors whose corresponding feature points are near the top-right corner of the image).

For clarity of description, image descriptors will be referred to herein directly as having certain attributes such as geometric locations, even though image descriptors themselves may not technically have such attributes (i.e., since it is technically the feature point corresponding to the image descriptor that would have the geometric location property in this example). It will be understood that such references are meant to imply properties closely associated with, if not directly tied to, the image descriptors themselves. For example, a geometric location "of an image descriptor" will be understood to refer more precisely to the geometric location of the feature point to which the image descriptor corresponds (since the feature point does have a location property within the image), a geometric distance "between image descriptors" will be understood to refer more precisely to a geometric distance between feature points to which the image descriptors correspond, and so forth.

At operation 208, system 100 may select one or more image descriptors from the subset of image descriptors of the proximity listing determined at operation 206. For example, based on the proximity listing, system 100 may perform various operations that will be described in more detail below to strategically select, for each of one or more primary image descriptors, one or more secondary image descriptors that make a good pairing with the primary image descriptors according to criteria that will be described and made apparent below. Specifically, for instance, the secondary image descriptor(s) selected for a particular primary image descriptor may be selected to be geometrically proximate to the primary image descriptor while also being dissimilar to the primary image descriptor. As will be made apparent in the description below, it will be understood that each image descriptor of the descriptor listing generated at operation 202 may serve both as a primary image descriptor in certain selected pairs, and as a secondary image descriptor in other selected pairs.

At operation 210, system 100 may combine each primary image descriptor with one or more selected secondary descriptors to form one or more composite image descriptors that may be used in addition to, or instead of, the original non-composite image descriptors generated in connection with operation 202. For example, system 100 may combine the primary image descriptor and the secondary image descriptor to form a composite image descriptor that has greater uniqueness and/or other desirable properties than either the primary or secondary image descriptor by itself. System 100 may provide or use these composite image descriptors in any suitable way to create any of the benefits described herein. For example, by supplying composite image descriptors generated at operation 210, system 100 may help implement a highly accurate image search with a low risk of false positive matches, such as described above.

To illustrate various concepts mentioned above with respect to system 100 of FIG. 1 and method 200 of FIG. 2, FIGS. 3-9 will now be described. The image and data illustrated in FIGS. 3-9 will be understood to correspond to a single extended example of how system 100 may generate composite image descriptors in accordance with a particular embodiment of method 200. While the following description deeply explores the extended example provided, it will be understood that this extended example is provided for illustrative purposes only and does not limit the scope of the various types of embodiments set forth by the claims following this description.

Figure 3:
FIG. 3 shows an illustrative image depicting content that includes various objects according to embodiments described herein.

FIG. 3 shows an illustrative image 300 that will be referred to throughout the following extended example of FIGS. 3-9. As shown, image 300 depicts various objects within a real-world scene. For example, image 300 may represent an image captured in real time by an extended reality player device (e.g., an augmented reality player device) as a user of the device engages in an augmented reality experience. The device that captures and processes image 300 may also implement or be closely associated with system 100 (e.g., communicatively coupled to system 100 with low latency). For example, the device may be a mobile device (e.g., a smartphone or tablet device, etc.), a head-mounted extended reality player device (e.g., smart glasses, etc.), or the like. In some examples, the device may be communicatively coupled (e.g., by a low latency network link) with a server system that implements system 100 and is configured to assist the media player device (e.g., a local server, a MEC server, a cloud server, etc.).

As shown within image 300, a current field of view of a camera included within the device includes a variety of objects 302 (e.g., objects 302-1 through 302-5). Objects 302 are shown in image 300 to include a portion of a table 302-1 on which rests a magazine 302-2. A wall 302-3 is in the background along with part of a window 302-4 outside of which can be seen a fence 302-5. It will be understood that as a user moves the device and its embedded camera, additional images similar to image 300 may likewise be captured or otherwise generated, and these additional images may be processed in like manner as described herein for image 300. For instance, these additional images may show objects 302 from different vantage points (e.g., as the user moves the camera) or may show different portions of objects 302 or other objects in the real-world scene within which the device and camera are located. Additionally, it will be understood that the augmented reality application described in connection with image 300 is an illustrative example only, and that other types of images (e.g., images being analyzed for an Internet database, images captured by a fixed security camera, scanned documents, video images, non-photographic images, etc.) may likewise be processed in analogous ways as will be described for the augmented reality example associated with image 300.

As mentioned above with respect to operation 202 of method 200, system 100 may generate a descriptor listing that includes a plurality of image descriptors (i.e., original, non-composite image descriptors) corresponding to different feature points included within image 300. This may be performed in any suitable way. For example, system 100 may generate the descriptor listing by performing operations such as accessing image 300, analyzing image 300 to identify different feature points included within the image, and generating respective image descriptors for each of the feature points that are identified.

Each of these operations may be performed in real time in certain examples. For instance, system 100 may access image 300 in real time as the image is generated by receiving image 300 from a camera of an augmented reality player device immediately as image 300 is captured by the camera. System 100 may analyze the image to identify the various feature points in real-time using image processing or pre-processing algorithms adapted to that end. For example, feature extraction algorithms such as corner detection algorithms (e.g., Harris corner detection algorithms), eigenvalue detection algorithms, or other such algorithms and techniques may be employed to extract salient features that can be used as center points for image descriptors (e.g., center points around which image data is sampled to generate the image descriptors).

Upon identifying the feature points (e.g., immediately in real time), system 100 may use the identified feature points to generate the image descriptors that are to be among the plurality of original, non-composite image descriptors included in the descriptor listing. For example, the list of salient feature points that has been generated may be iterated to generate image descriptors corresponding to each feature point according to suitable image descriptor techniques such as, for instance, a binary robust invariant scalable keypoint ("BRISK") technique, a FAST-BRISK technique, a scale-invariant feature transform ("SIFT") technique, a speeded up robust features ("SURF") technique, a KAZE or AKAZE technique, an oriented FAST and rotated BRIEF ("ORB") technique, a technique involving machine-learned descriptors (e.g., descriptors generated using a deep neural network, etc.), or any other suitable custom or established technique. Each image descriptor generated in this way will be understood to represent attributes of the image data immediately surrounding a center point (e.g., the feature point). For example, the image descriptor may be configured to describe the relevant image data in a manner that is scale invariant, rotation invariant, light invariant, and/or otherwise invariant or insensitive to the types of differences that might be found in similar images that depict identical or similar subject matter (e.g., two images of the same object or scene from different viewpoints, with different lighting conditions, at different zoom levels, etc.).

Figure 4:
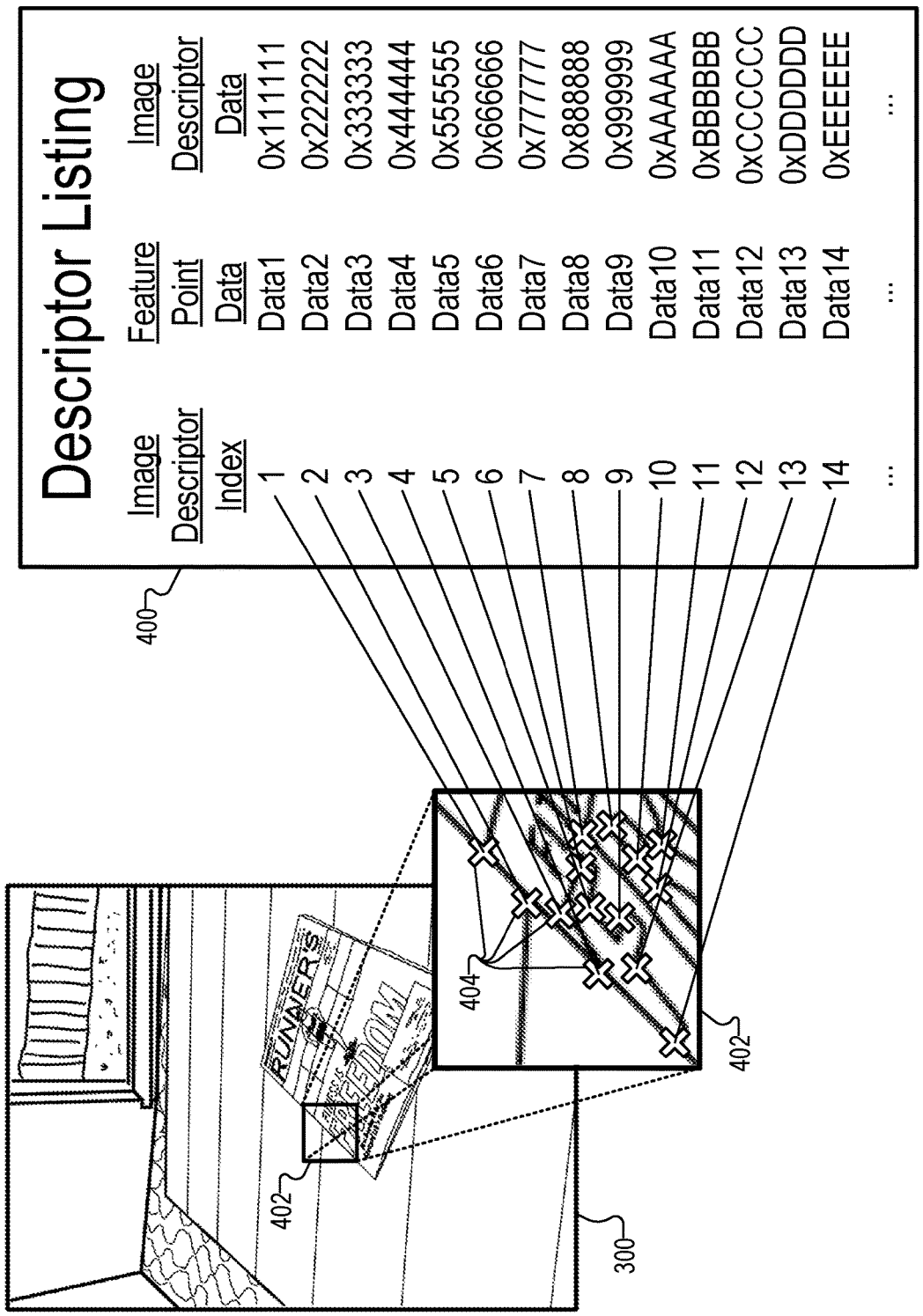
FIG. 4 shows an illustrative descriptor listing that includes a plurality of image descriptors corresponding to different feature points included within the image of FIG. 3 according to embodiments described herein.

To illustrate salient feature points and image descriptors of an image such as image 300, FIG. 4 shows an illustrative descriptor listing 400 that includes a plurality of image descriptors corresponding to salient feature points included within the image of FIG. 3. Specifically, as shown, a portion 402 of image 300 (e.g., a small square portion depicting a part of table 302-1 and a part of magazine 302-2) is enlarged in FIG. 4 to more clearly indicate various feature points 404 that have been identified within that portion of the image. Each feature point 404 is demarcated with an 'X' shape in the enlarged portion 402 and, as shown, these feature points correspond to corner points and/or other features that may be identified by feature detection algorithms described herein.

Lines extending from each feature point 404 to a different respective image descriptor index in descriptor listing 400 illustrate the correspondences between feature points 404 and data associated therewith. Specifically, as shown, each feature point 404 shown in FIG. 4 is assigned an image descriptor index 1-14 and corresponds with feature point data and image descriptor data within descriptor listing 400. For example, a feature point 404 assigned image descriptor index '1' is shown to correspond to feature point data labeled "Data1" and image descriptor data "0x111111".

It will be understood that the feature point data and image descriptor data depicted in FIG. 4 are used as placeholders for actual data that may be stored in a descriptor listing of a particular embodiment. For example, each label "Data1", "Data2", "Data3", and so forth in the feature point data column may represent various types of feature point data that may be determined and stored for a given feature point. For instance, the feature point data represented by these labels may include a coordinate (x, y) location within image 300, an octave representation (e.g., a pyramid level as will be described in more detail below), a response representation (e.g., data representing the strength of image signal data), a radius representation (e.g., data representing the scope or reach of the image descriptor centered at the feature point), and/or any other parameters as may serve a particular implementation. Similarly, the 24-bit hexadecimal representations of image descriptor data depicted in descriptor listing 400 (e.g., "0x111111", "0x222222", "0x333333", etc.) are illustrative and easy-to-read examples of binary data that will be understood to represent binary data of image descriptors generated in a particular implementation (which may be 512-bits or another suitable bit length and which may not be so easily readable and distinguishable from one another as shown herein for illustrative purposes).

In some examples, different image descriptors included within a descriptor listing such as descriptor listing 400 may be determined in stages based on a pyramiding technique (a "pyramid scheme") in which an image such as image 300 is processed several times at several different resolutions to identify feature points and corresponding image descriptors for each of the different resolutions. For example, a highly detailed (high resolution) analysis of the image may represent the base of a pyramid, while progressively less detailed (lower resolution) analyses of the image may represent the narrower layers of the pyramid moving from the base to the tip. In particular, in one embodiment, the plurality of image descriptors included in descriptor listing 400 may include 1) a first group of image descriptors generated for image 300 at a first image resolution (e.g., a relatively high resolution), and 2) a second group of image descriptors generated for image 300 at a second image resolution that is less than the first resolution. For example, the first group of image descriptors may include image descriptors 1-14 (i.e., the image descriptors having image descriptor indices labeled 1-14), as well as other image descriptors not explicitly shown in FIG. 4, while the second group of image descriptors may include image descriptors not explicitly shown in FIG. 4. The second group of image descriptors may correspond to some of the same feature points as illustrated in FIG. 4 (feature points 404), but, since the processing is performed at a lower resolution, there may be fewer and/or different feature points identified in connection with the second group of image descriptors.

In embodiments employing a pyramiding technique, the operations of method 200 (e.g., the generating of the geometric map, the determining of the proximity listing, the selecting of the secondary image descriptor, and the combining of the primary and secondary image descriptors to form the composite image descriptor) and/or other operations described herein may each be performed in a first stage for the first group of image descriptors, and in a second stage for the second group of image descriptors. In other examples, more than two groups may be employed as the image is processed in multiple resolutions and the operations are repeated at each pyramid level. For instance, various layers of data processing for image 300 may be performed by resizing the image by a factor of one half from the previous layer (e.g., starting from the original resolution and cutting the resolution in half for each layer until reaching some user-defined end resolution). As one example, five pyramid levels may be used for an image of resolution of 1000×1000 pixels as the image is reprocessed at 500×500 pixels, 250×250 pixels, 125×125 pixels, and 63×63 pixels, or the like. In this example, the image would be processed in a similar manner at each pyramid level so that image descriptors may represent the image information at multiple resolutions and thereby provide a more accurate and full description of the image.

While descriptor listing 400 may include all of the information needed to strategically combine image descriptors to form composite image descriptors, the list format of descriptor listing 400 may not indicate the geometric relationships of any of the feature points. Because it may be desirable to account for these geometric relationships as image descriptors pairs are selected, system 100 may generate, based on the feature point data of descriptor listing 400, a data structure that represents geometric positions of each image descriptor within image 300 (or, more precisely, represents geometric positions of each feature point corresponding to the image descriptors). This data structure will be referred to herein as a geometric map for the image descriptors within the image.

Figure 5:
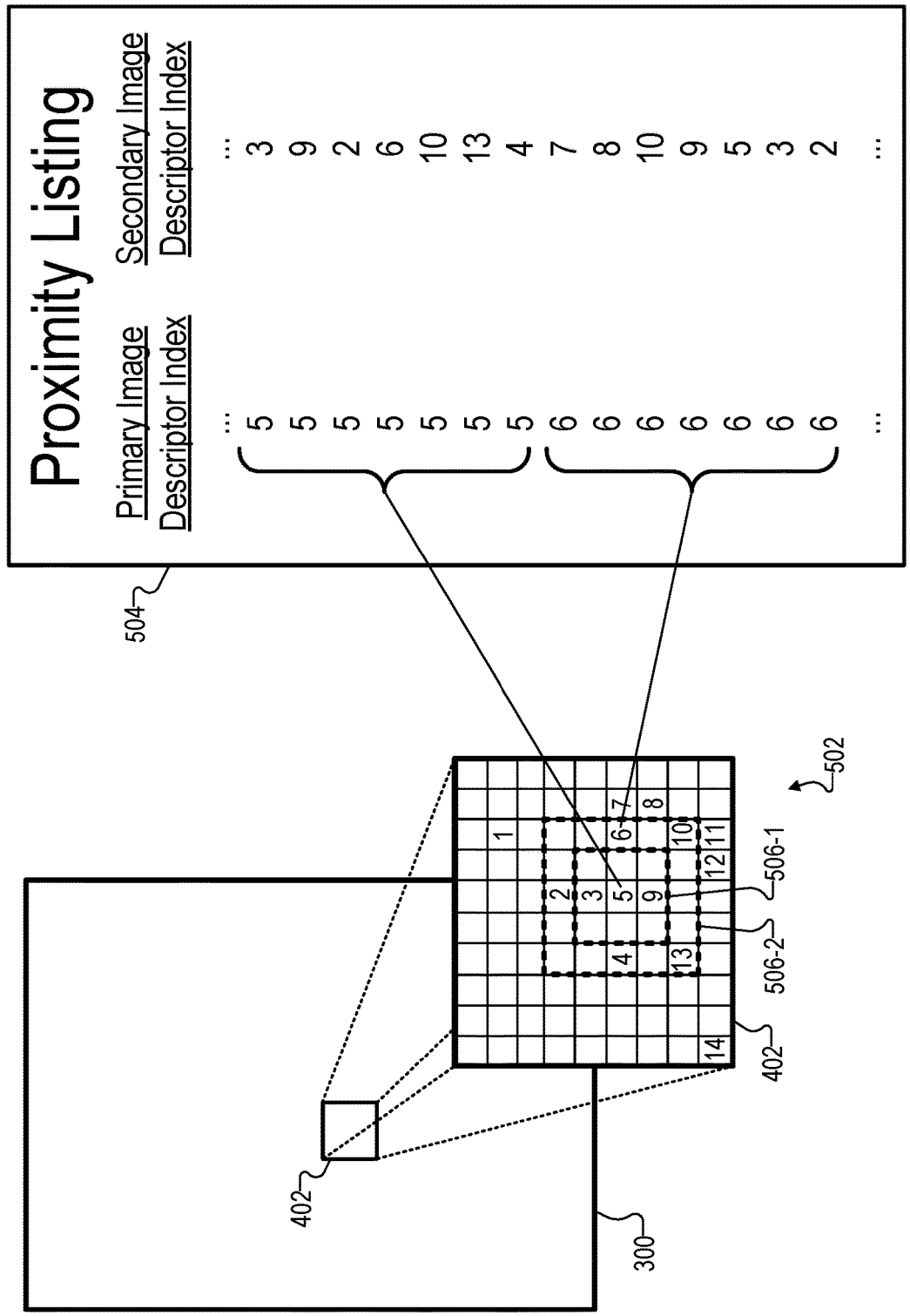
FIG. 5 shows an illustrative geometric map and a corresponding proximity listing indicating pairs of geometrically proximate image descriptors from the descriptor listing of FIG. 4 according to embodiments described herein.

To illustrate an example, FIG. 5 shows a portion of a geometric map 502. Specifically, as shown, the portion of geometric map 502 shown in FIG. 5 corresponds to the same portion 402 of image 300 described above in relation to FIG. 4. Rather than showing the imagery depicted in image 300 (or in portion 402), FIG. 5 shows data illustrative of various aspects of geometric map 502 to illustrate how image descriptors and their positions may be represented in this data structure and associated with one another.

A first operation that may be performed as part of generating geometric map 502 may include partitioning image 300 into a plurality of bins arranged in horizontal rows and vertical columns. As shown in FIG. 5, the portion of geometric map 502 illustrated is partitioned into a grid with several horizontal rows and vertical columns. This type of data structure may be constructed, for example, by creating a matrix in computer memory of integer values that may be initialized to '0' (representing no image descriptor located at the row and column associated with that location). Additionally or alternatively, the geometric map data structure may be created by generating a matrix in computer memory that includes elements corresponding to a list of items (vector or array) that represent multiple feature points that fall in the same bin location. The number of rows and columns in the matrix of the geometric map may be selected so as to correspond to the input image resolution by a certain factor referred to herein as a bin pixel size. As one example, for a bin pixel size of 2 and an image resolution of 1000×1000 pixels, the geometric map matrix may contain 500 columns and 500 rows.

Upon creating and initializing the matrix in memory, system 100 may assign each image descriptor of the plurality of image descriptors to a respective bin of the plurality of bins based on a position within the image of the respective feature point corresponding to the image descriptor. For example, as shown in FIG. 5, the image descriptor index corresponding to each feature point is assigned to the nearest row and column (i.e., the nearest box in the grid of geometric map 502) so that image descriptors 1-14 are each represented in geometric map 502 in accordance with their geometric positions within image 300. As shown, several bins in the grid are left blank if no image descriptor is associated with that part of the image. These blank bins will be understood to be represented by 0 s or another suitable null value or placeholder in the data structure (e.g., the matrix stored in memory), while integers representing the image descriptor indices 1-14 may be stored at the other rows and columns as shown. For example, if the bin pixel size parameter is 2 and the feature point associated with image descriptor index 1 is at coordinates (x, y)=(50, 120), then the geometric map location for image descriptor 1 may be at a bin associated with column 25 and row 60.

Together with geometric map 502, FIG. 5 also shows a proximity listing 504 that, based on geometric map 502, indicates pairs of geometrically proximate image descriptors from descriptor listing 400. Ellipsis within proximity listing 504 indicate that not all of the proximate pairs of image descriptors 1-14 (let alone pairs of image descriptors outside of portion 402 of image 300) are represented in FIG. 5. Rather, the portion of proximity listing 504 illustrated depicts proximate pairs of image descriptors based on image descriptors 5 and 6 as the primary image descriptors to which prospective secondary image descriptors (i.e., image descriptors that may be, but have not yet been, selected for formation of a composite image descriptor with the primary image descriptor) are paired. As shown, for example, when image descriptor 5 is set as a primary image descriptor, image descriptors 3, 9, 2, 6, 10, 13, and 4 are determined to be prospective secondary image descriptors that are proximate to (e.g., within a vicinity of) image descriptor 5. As another example, when image descriptor 6 is the primary image descriptor, image descriptors 7, 8, 10, 9, 5, 3, and 2 are determined to be prospective secondary image descriptors that are proximate to image descriptor 6.

The determining of proximity listings for each image descriptor may be performed in any suitable manner and using any suitable radius to define what is considered to be "proximate to" or "in a vicinity of" a particular primary image descriptor. For instance, for each bin of the plurality of bins that is within a search radius of a first bin to which a primary image descriptor (e.g., image descriptor 5) is assigned, system 100 may: 1) determine whether the bin is assigned an image descriptor of the plurality of image descriptors; and 2) if the bin is assigned an image descriptor, include that image descriptor in the subset of image descriptors indicated by the proximity listing. To illustrate, an area 506-1 incorporates each of the bins within a search radius of one bin from image descriptor 5 (e.g., immediately adjacent to the bin of image descriptor 5). Accordingly, for a search radius of one bin, each bin within area 506-1 may be iteratively examined to determine that image descriptors 3 and 9 are proximate to image descriptor 5. Similarly, an area 506-2 incorporates each of the bins within a search radius of two bins from image descriptor 5 (e.g., all the bins within area 506-1 and all the bins immediately adjacent to those bins). Accordingly, for a search radius of two bins (i.e., the search radius illustrated for proximity listing 504), each bin within area 506-2 may be iteratively examined to determine that image descriptors 3, 9, 2, 6, 10, 13, and 4 are proximate to image descriptor 5. In certain examples, a search radius may not include the corner bins shown to be included in areas 506-1 and 506-2. In this type of implementation, for instance, image descriptors 10 and 13 would not be included within the subset of secondary image descriptors paired with primary image descriptor 5 if the search radius is two bins.

While FIG. 5 illustrates a geometric map and proximity listing for a single resolution of image data (e.g., a single octave or pyramid level in a pyramid scheme such as described above), it will be understood that analogous operations described and illustrated with respect to FIG. 5 may be performed for each of several resolutions or octaves. For example, geometric map 502 and proximity listing 504 may be generated for a full resolution (e.g., 1000×1000 pixels) of image 300, another geometric map and proximity listing (not explicitly shown) may be generated for a reduced resolution (e.g., 500×500 pixels) of image 300, and so forth.

While each of the prospective secondary image descriptors determined to be proximate to a particular primary image descriptor (e.g., image descriptor 5) may serve as a suitable match for the primary image descriptor, it may be desirable to further filter and refine this list to ultimately select only the most optimal and advantageous matches for the primary image descriptor. For example, though seven secondary image descriptors have been added to the subset of prospective image descriptors proximate to image descriptor 5 in the example of proximity listing 504, it may be desirable to select only one or three or another suitable quantity of secondary image descriptors (rather than all seven). Accordingly, proximity listing 504 may be further generated to include data indicative of properties of each prospective match such that the pairs may be filtered and sorted to select a limited number of the most optimal matches for use in generating composite image descriptors.

To illustrate, FIG. 6 shows an illustrative raw (e.g., unfiltered, unsorted, etc.) proximity listing 600 that includes additional data for certain pairs of geometrically proximate image descriptors that were included in proximity listing 504. For clarity of illustration, FIG. 6 depicts only the listing entries in which image descriptor 5 is the primary image descriptor. However, it will be understood that the ellipses in FIG. 6 may represent various other entries in which each of the other image descriptors are set as the primary image descriptor.

In certain examples, the selection of one or more prospective secondary image descriptors may be based on a geometric distance between the primary image descriptor and each prospective secondary image descriptor on the geometric map. As such, proximity listing 600 is shown to be generated not only to exclude secondary image descriptors that are not within the vicinity of primary image descriptor 5 (as described above in relation to proximity listing 504), but also so as to include data representative of how proximate the corresponding feature points are for the prospective pairs of image descriptors ("Geometric Distance"). For example, as shown, the geometric distance from image descriptor 5 to image descriptor 3 may be 10 (e.g., 10 pixels or another suitable distance unit as may serve a particular implementation), the geometric distance from image descriptor 5 to image descriptor 9 may be 9, the geometric distance from image descriptor 5 to image descriptor 2 may be 21, and so forth.

The geometric distance be may be computed using any suitable equation or methodology. For instance, system 100 may employ a Euclidean distance formula into which coordinates associated with the image descriptors are entered. For example, if the primary image descriptor is associated with a feature point at $(X_1, Y_1)$ and a prospective secondary image descriptor is associated with a feature point at $(X_2, Y_2)$, the geometric distance between the image descriptors may be computed as:

$$\text{Geometric Distance} = \sqrt{(X_2 - X_1)^2 + (Y_2 - Y_1)^2}$$

The selection of one or more secondary image descriptors may additionally or alternatively be based on a similarity between the primary image descriptor and each prospective secondary image descriptor. As such, proximity listing 600 is shown to be generated to further include data representative of how similar the primary and secondary image descriptors are to one another ("Similarity"). For example, as shown, the similarity between image descriptors 5 and 3 is given a similarity metric of 5 (indicating that image descriptors 5 and 3 are relatively dissimilar from one another), the similarity between image descriptors 5 and 9 is given a similarity metric of 2 (indicating that image descriptor 9 is even more dissimilar from image descriptor 5 than is image descriptor 3), the similarity between image descriptors 5 and 2 is given a similarity metric of 18 (indicating that image descriptors 5 and 2 are relatively similar to one another), and so forth.

The similarity between image descriptors may be quantified and determined in any manner as may serve a particular implementation (e.g., based on the image descriptor technology employed to generate the image descriptors). For example, floating point image descriptors such as those generated using a SIFT technique may be analyzed for similarity using a Euclidean distance computed with as many dimensions as there are items in the image descriptor vector. In contrast, for binary image descriptors such as those generated using a BRISK technique, a Hamming function may be employed that tallies up the difference in individual bits represented in the two image descriptors. For example, to measure the similarity between two 512-bit BRISK image descriptors, a Hamming function may be used to determine how many bits are different (e.g., one bit being '0' and the other being '1') of the total number of bits representing the image descriptor (e.g., 512 bits in certain examples). The more bits are the same, the higher similarity metric may be assigned. For the example of FIG. 6, similarity metrics with arbitrary units are used for illustrative purposes to indicate relative similarities of different prospective matches.

Geometric distances and/or similarities between a primary image descriptor and one or more prospective secondary image descriptors, as determined in the ways described above and as indicated in raw proximity listing 600, may be used in any suitable way to facilitate a strategic and optimal selection of a secondary image descriptor to be combined with a primary image descriptor. As one example, for instance, the selecting of one or more secondary image descriptors to be paired with a primary image descriptor (e.g., image descriptor 5) may be based on the geometric distance by filtering the subset of image descriptors indicated by proximity listing 600 to exclude image descriptors that are more than a threshold distance away from the primary image descriptor on the geometric map. Similarly, as another example, the selecting of one or more secondary image descriptors to be paired with a primary image descriptor may be based on the similarity by filtering the subset of image descriptors indicated by proximity listing 600 to exclude image descriptors that are more similar to the primary image descriptor than a similarity threshold.

Figure 7:
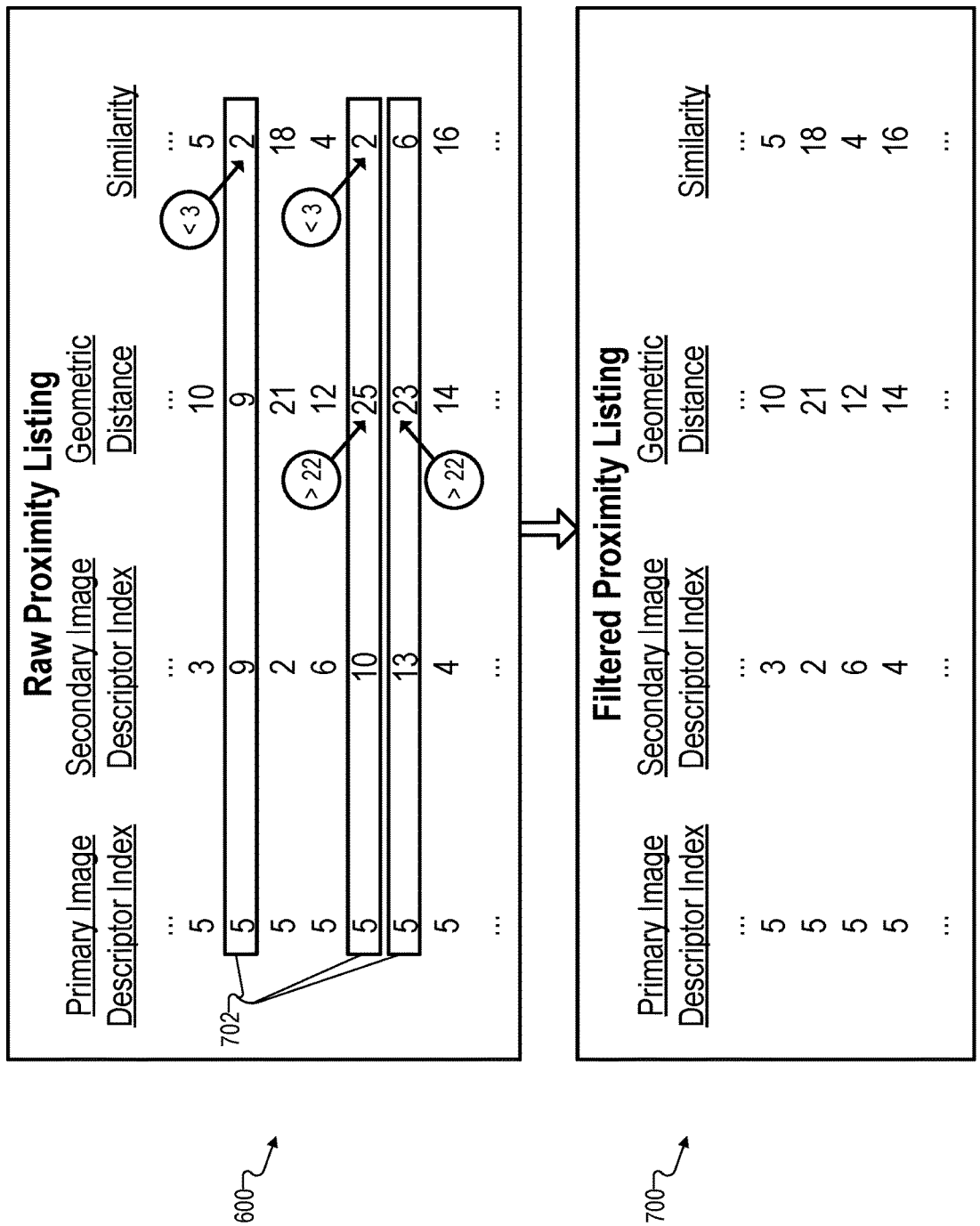
FIG. 7 shows an illustrative filtering of the proximity listing of FIG. 6 according to embodiments described herein.

To illustrate, FIG. 7 shows an example of how raw proximity listing 600 may be filtered based on geometric distance and similarity to generate a filtered proximity listing 700. More particularly, filtered proximity listing 700 includes certain of the same entries as raw proximity listing 600 while other entries are filtered out based on the geometric distance and/or similarity between primary image descriptor 5 and the prospective secondary image descriptors (i.e., image descriptors 3, 9, 2, 6, 10, 13, and 4).

The filtering of raw proximity listing 600 may be performed in any suitable way. For example, as illustrated in FIG. 7, certain entries 702 of raw proximity listing 600 that are associated with certain secondary image descriptors (i.e., entries 702 for prospective secondary image descriptors 9, 10, and 13 in this example) are excluded or filtered out either for having a geometric distance greater than a threshold distance of 22 (as is the case for entries corresponding to image descriptors 10 and 13) and/or for having a similarity metric less than 3 (as is the case for entries corresponding to image descriptors 9 and 10). The secondary image descriptors of excluded entries 702 may be considered to be too far away from or too similar to the primary image descriptor to be an optimal match, and thus may be filtered out at this step.

The threshold values used to perform the filtering of raw proximity listing 600 may be selected in any manner as may serve a particular implementation. For example, the threshold values may be statically predetermined in certain implementations, while being automatically and dynamically determined (e.g., based on any suitable condition such as a number of prospective secondary image descriptors in the vicinity of the primary image descriptor, etc.) in other implementations. As shown, when the filtering is complete, filtered proximity listing 700 may include entries only for prospective secondary image descriptors that are relatively dissimilar to the primary image descriptor and that are located relatively nearby the primary image descriptor. Specifically, FIG. 7 shows that filtered proximity listing 700 includes all of the same entries as raw proximity listing 600 except for excluded entries 702 (i.e., entries corresponding to secondary image descriptors 3, 2, 6, and 4).

In some examples, filtered proximity listing 700 may be filtered such that all of the remaining entries are suitable for use in generating composite image descriptors. For instance, it may be acceptable in a certain implementation for all four of the entries of filtered proximity listing 700 to be converted into composite image descriptors and system 100 may commence with generating such composite image descriptors based directly on filtered proximity listing 700. In other examples, however, it may be desirable to cull down filtered proximity listing 700 even more to select only a particular number of prospective matches for generation of composite image descriptors. For instance, it may be desirable for each primary image descriptor (including image descriptor 5 used as the primary image descriptor in this example) to be matched with no more than one or two or three secondary image descriptors (or any other suitable quantity of secondary image descriptors). In such examples, the selecting of the secondary image descriptors may include filtering the subset of image descriptors indicated by proximity listing 600 as described above (e.g., to exclude image descriptors that are more than the threshold distance away from the primary image descriptor on the geometric map or that are more similar to the primary image descriptor than a similarity threshold). Moreover, in these examples, the selecting may further include: 1) sorting the filtered subset of image descriptors from a least similar image descriptor to a most similar image descriptor; and 2) designating (e.g., using the filtered and sorted subset of image descriptors) the least similar prospective secondary image descriptors as the selected secondary image descriptors.

Figure 8:
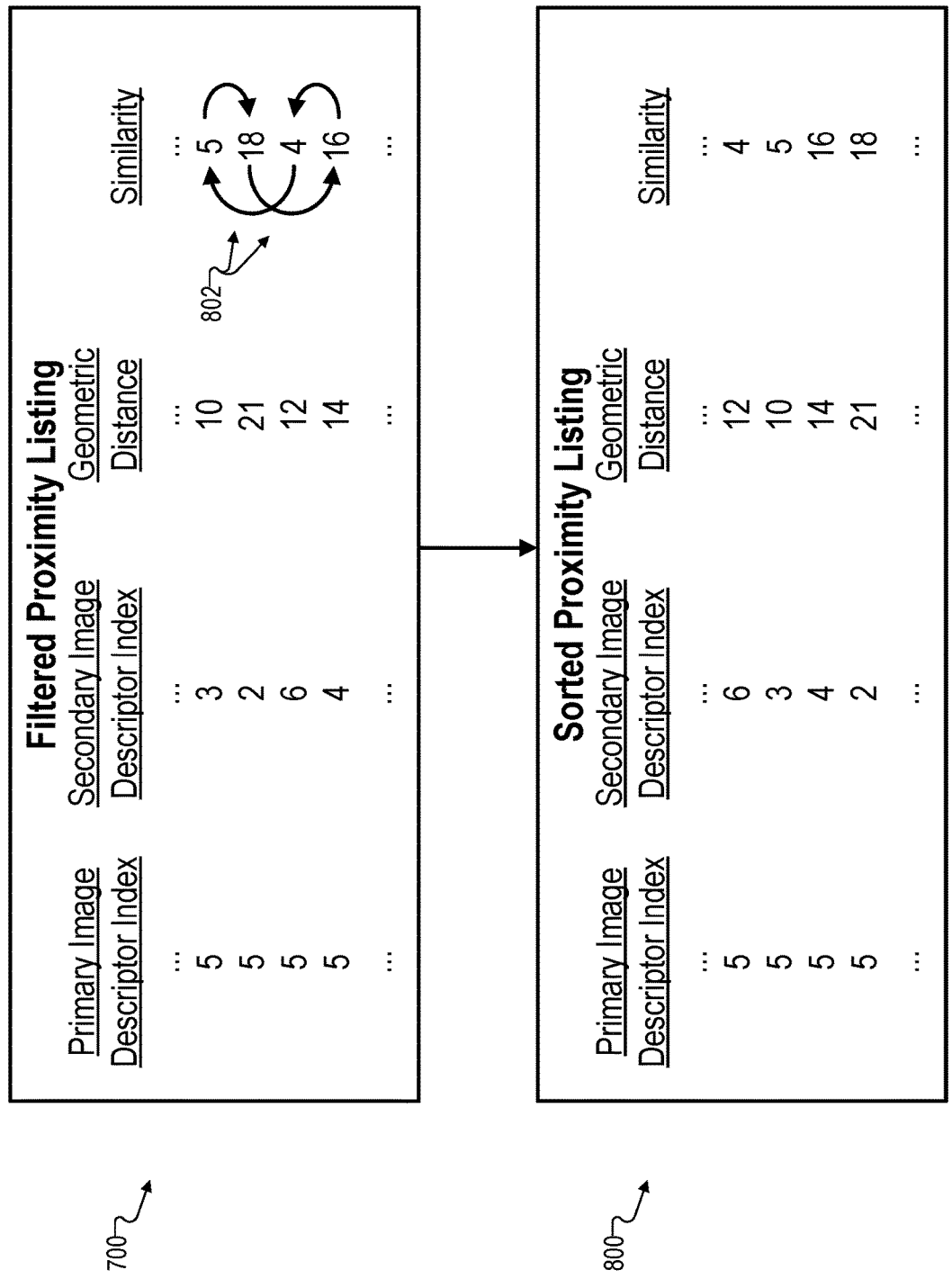
FIG. 8 shows an illustrative sorting of the proximity listing of FIG. 7 according to embodiments described herein.

To illustrate, FIG. 8 shows an example of how proximity listing 700 may be sorted to generate a sorted proximity listing 800. As shown by rearrangement arrows 802, each entry of filtered proximity listing 700 is sorted so that the entries for primary image descriptor 5 are sorted from the most dissimilar secondary image descriptor (i.e., the secondary image descriptor associated with the lowest similarity metric) to the most similar secondary image descriptor (i.e., the secondary image descriptor associated with the highest similarity metric). Specifically, as illustrated, sorted proximity listing 800 orders the entries starting with secondary image descriptor 6 (the most dissimilar image descriptor to image descriptor 5 based on its low similarity metric of 4), and followed by secondary image descriptor 3 (with a similarity metric of 5), secondary image descriptor 4 (with a similarity metric of 16), and secondary image descriptor 2 (the most similar image descriptor to image descriptor 5 based on its high similarity metric of 18).

Based on sorted proximity listing 800, system 100 may select however many secondary image descriptors are desired for a particular implementation by selecting secondary image descriptors starting at the top of the list and moving down. For example, for an implementation in which three secondary image descriptors are to be selected for each primary image descriptor, system 100 may use the top three entries of sorted proximity listing 800 (corresponding to secondary image descriptors 6, 3, and 4, respectively) to generate three composite image descriptors.

To illustrate, FIG. 9 shows an example listing 900 that contains composite image descriptors generated by system 100 based on filtered and sorted proximity listing 800. As shown, the top three entries of proximity listing 800 have been selected and the image descriptor data of these entries has been combined to form three composite image descriptors with the composite image descriptor data indicated. The combining of a primary and a selected secondary image descriptor to form a composite image descriptor may be performed in any suitable manner. For instance, as shown in listing 900, each primary and secondary image descriptor pair may be combined by merging or concatenating the bits together (e.g., concatenating 24-bit value 0x555555 with 24-bit value 0x666666 to form 48-bit value 0x555555666666 in the example of the first entry in listing 900, etc.). In other examples, image descriptor data may be combined in other suitable ways such as by use a mathematical operation (e.g., adding, multiplying, averaging, etc.) or the like.

Figure 10:
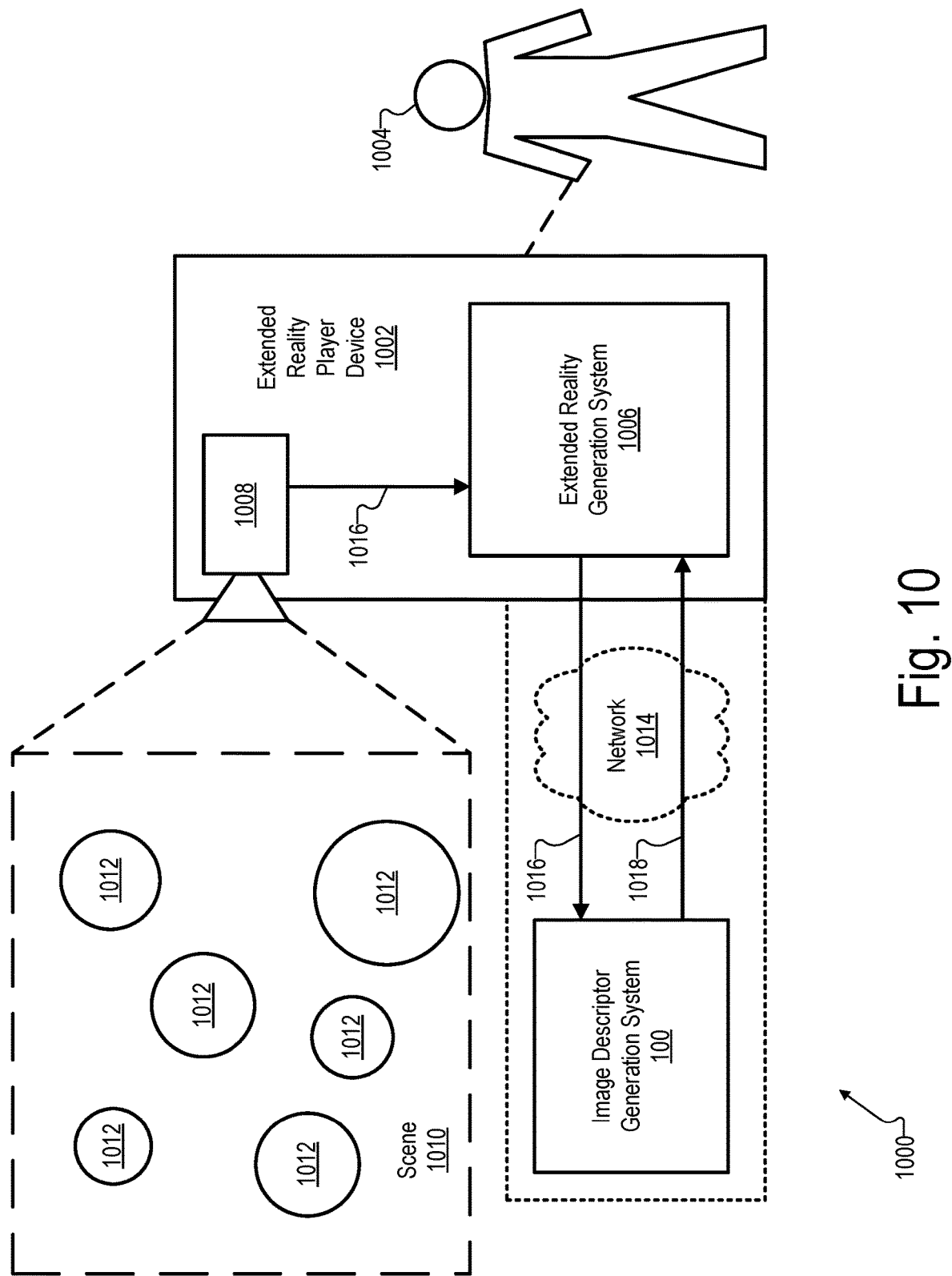
FIG. 10 shows an illustrative configuration in which the image descriptor generation system of FIG. 1 may operate to generate composite image descriptors according to embodiments described herein.

As mentioned above, composite image descriptors such as those generated in the extended example presented in connection with FIGS. 3-9 may be used in a various applications and use cases. To illustrate one particular example, FIG. 10 shows a configuration 1000 in which system 100 may operate to generate and use composite image descriptors such as those described herein. In the illustrative context of configuration 1000, an image to be processed (e.g., image 300) may depict a real-world scene and may be captured and provided to the image descriptor generation system in real time by an extended reality generation system (e.g., an augmented reality generation system). Moreover, in this use case, system 100 may provide composite image descriptors that are generated to the extended reality generation system for use by the extended reality generation system in identifying one or more predetermined target objects within the image. For instance, in the example of image 300, composite image descriptors generated by system 100 may help to accurately identify the cover artwork of magazine 302-2 even if thousands or millions of instances of similar artwork (e.g., magazine covers, etc.) exist in a search database of target objects that are to be identified in captured images.

Configuration 1000 shows that system 100 is communicatively coupled to an extended reality player device 1002 (e.g., implemented as a mobile device such as a smartphone, as head-mounted augmented reality goggles, etc.) used by a user 1004. Extended reality player device 1002 is shown to include an extended reality generation system 1006 and a camera 1008 that user 1004 may direct toward a scene 1010 to capture images of objects 1012 within scene 1010. In some examples, system 100 may be integrated within extended reality player device 1002 (e.g., leveraging the same processor as extended reality generation system 1006). This relationship is illustrated by a dotted line encompassing system 100 and connecting it to extended reality player device 1002. In other examples, system 100 may be separate and apart from extended reality player device 1002. For instance, system 100 may be implemented by a MEC server, cloud server, or the like, that is remote from extended reality player device 1002 and communicatively coupled thereto by way of a network 1014 (e.g., the Internet, a mobile provider network such as a 5G data network, a local or wide area network, a combination thereof, etc.).

Regardless of how system 100 is implemented with respect to extended reality player device 1002, system 100 may receive image data 1016 from extended reality generation system 1006. For example, image data 1016 may include a video feed of images such as image 300 that are captured by camera 1008 and that depict various objects 1012 of scene 1010 (e.g., objects analogous to objects 302 of image 300 described above). Based on image data 1016, system 100 may perform operations described above to identify feature points, to generate a descriptor listing and a corresponding geometric map, to determine a proximity listing that may be filtered and sorted, to select one or more secondary image descriptors for each primary image descriptor, and to combine primary and secondary image descriptors to form composite image descriptors. These composite image descriptors may be represented in composite image descriptor data 1018, which, as shown, may be provided by system 100 back to extended reality generation system 1006 for use in generating extended reality media content to be presented to user 1004 (e.g., by way of an output display, audio output equipment, etc., not explicitly shown).

For example, extended reality generation system 1006 may use the composite image descriptors represented in composite image descriptor data 1018 to compare various objects depicted in image data 1016 to a potentially very large search database of targets that have previously been analyzed and tagged with composite image descriptors generated in the same ways described above. For instance, thousands of magazine cover targets may be stored in a database with hundreds of composite image descriptors associated with each target. As such, when a particular magazine cover is visible within images captured by camera 1008 (e.g., because one of objects 1012 is the particular magazine), extended reality generation system 1006 may compare composite image descriptors received from system 100 with composite image descriptors associated with the magazine cover in the database to discover that there is a positive match. Extended reality generation system 1006 may then augment imagery presented to user 1004 to render an augmentation over the magazine cover so as to generate the desired extended reality effect. Due to the considerable increase in the scope and uniqueness of the composite image descriptors, as well as the strategic manner in which the composite image descriptors are formed, extended reality generation system 1006 may be far less likely to falsely match an object depicted in image data 1016 with an incorrect target regardless of how many targets may be included in the search database.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 11:
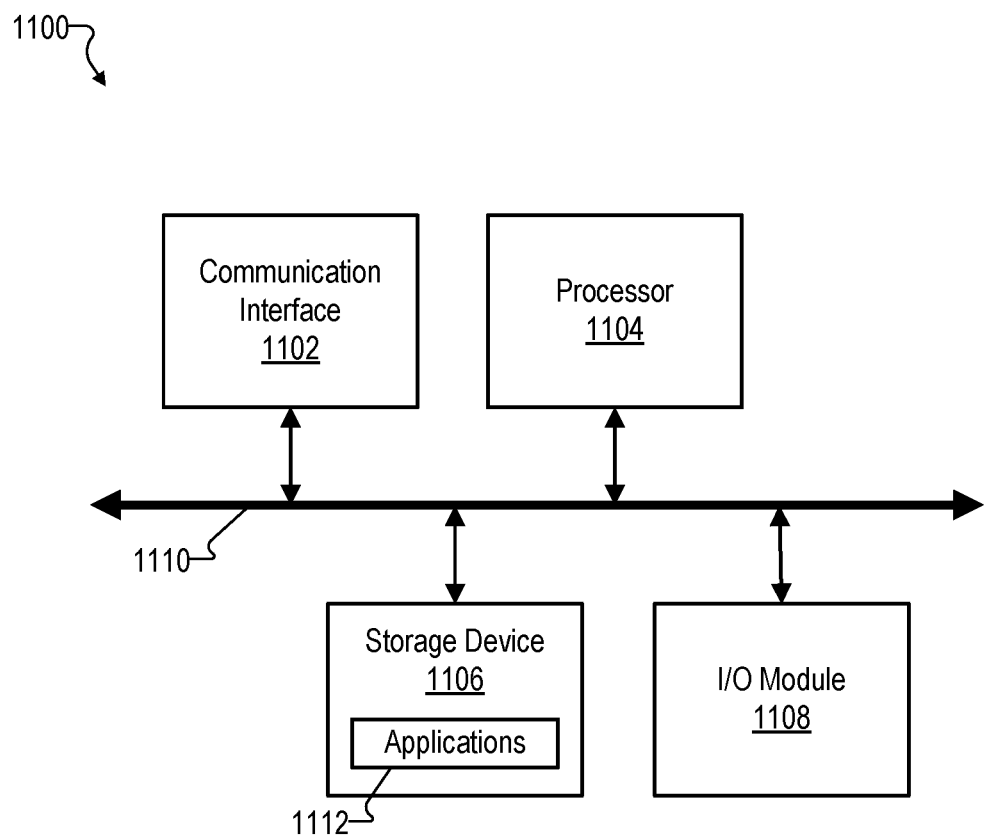
FIG. 11 shows an illustrative computing device that may implement image descriptor generation systems and/or other systems and devices described herein according to embodiments described herein.

FIG. 11 shows an illustrative computing device 1100 that may be specifically configured to perform one or more of the processes described herein and that may implement image descriptor generation systems and/or other systems and devices described above. For example, computing system 1100 may include or implement (or partially implement) an image descriptor generation system such as system 100 or any component included therein or system associated therewith. For instance, computing system 1100 may include or implement control or communications elements of certain capture devices such as camera 1008, an extended reality generation system such as extended reality generation system 1006, an extended reality player device such as extended reality player device 1002, or any other computing systems or devices described herein.

As shown in FIG. 11, computing system 1100 may include a communication interface 1102, a processor 1104, a storage device 1106, and an input/output (I/O) module 1108 communicatively connected via a communication infrastructure 1110. While an illustrative computing system 1100 is shown in FIG. 11, the components illustrated in FIG. 11 are not intended to be limiting. Additional or alternative components may be used in other embodiments. Components of computing system 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1106. For example, data representative of one or more executable applications 1112 configured to direct processor 1104 to perform any of the operations described herein may be stored within storage device 1106. In some examples, data may be arranged in one or more databases residing within storage device 1106.

I/O module 1108 may include one or more I/O modules configured to receive user input and provide user output. One or more I/O modules may be used to receive input for a single virtual experience. I/O module 1108 may include any hardware, firmware, software, or combination thereof supportive of input and output capabilities. For example, I/O module 1108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing system 1100. For example, one or more applications 1112 residing within storage device 1106 may be configured to direct processor 1104 to perform one or more processes or functions associated with processor 104 of system 100. Likewise, memory 102 of system 100 may be implemented by or within storage device 1106.

To the extent the aforementioned embodiments collect, store, and/or employ personal information of individuals, groups, or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information may be in an appropriately secure manner reflective of the type of information, for example, through various access control, encryption, and anonymization techniques for particularly sensitive information.

In the preceding specification, various example embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The specification and drawings are accordingly to be regarded in an illustrative rather than a restrictive sense.

What is claimed is:

1. A method comprising:
    determining a subset of image descriptors from a plurality of image descriptors that each correspond to a different feature point included within an image, the subset of image descriptors determined based on geometric proximity, within the image, of respective feature points of the subset of image descriptors to a feature point of a primary image descriptor, wherein the determining the subset of image descriptors comprises:
        generating a geometric map representing the plurality of image descriptors by partitioning the image into a plurality of bins;
        assigning each image descriptor of the plurality of image descriptors to a respective bin of the plurality of bins; and
        determining, for each particular bin of the plurality of bins that is within a search radius of a first bin to which the primary image descriptor is assigned, whether any of the plurality of image descriptors is assigned to the particular bin;
    selecting a secondary image descriptor from the subset of image descriptors; and
    combining the primary image descriptor and the secondary image descriptor to form a composite image descriptor.

2. The method of claim 1, further comprising:
    generating a descriptor listing that includes the plurality of image descriptors by:
        accessing the image,
        analyzing the image to identify feature points included within the image, and
        generating, for each of the respective feature points that are identified, a respective image descriptor to be among the plurality of image descriptors included in the descriptor listing; and
    identifying, from the descriptor listing, the primary image descriptor.

3. The method of claim 1, wherein the selecting of the secondary image descriptor includes:
    filtering the subset of image descriptors to exclude image descriptors that:
        correspond to respective feature points more than a threshold distance away from the feature point of the primary image descriptor within the image, or
        are more similar to the primary image descriptor than a similarity threshold; and
    designating, as the selected secondary image descriptor, a least similar image descriptor from the filtered subset of image descriptors.

4. The method of claim 1, further comprising:
    selecting one or more additional image descriptors from the subset of image descriptors; and
    combining the primary image descriptor with each of the one or more additional image descriptors to form one or more additional composite image descriptors.

5. The method of claim 1, wherein the selecting of the secondary image descriptor:
    includes filtering the subset of image descriptors to exclude image descriptors that correspond to respective feature points more than a threshold distance away from the feature point of the primary image descriptor within the image; and
    is based on a geometric proximity between the feature point of the primary image descriptor and a feature point of the secondary image descriptor.

6. The method of claim 1, wherein the selecting of the secondary image descriptor:
    includes filtering the subset of image descriptors to exclude image descriptors that are more similar to the primary image descriptor than a similarity threshold; and
    is based on a similarity between the primary image descriptor and the secondary image descriptor.

7. The method of claim 1, wherein the image depicts a real-world scene and the method further comprises providing the composite image descriptor to an extended reality generation system for use in identifying one or more predetermined target objects depicted within the image.

8. The method of claim 7, wherein the determining of the subset of image descriptors, the selecting of the secondary image descriptor, the combining of the primary and secondary image descriptors to form the composite image descriptor, and the providing of the composite image descriptor to the extended reality generation system are all performed in real time as the extended reality generation system captures the image and identifies the one or more predetermined target objects depicted within the image.

9. The method of claim 1, further comprising generating, based on the geometric map, a proximity listing for the primary image descriptor, the proximity listing indicating the subset of image descriptors and generated by including in the proximity listing any of the plurality of image descriptors that is determined to be assigned to any of the particular bins within the search radius of the first bin.

10. The method of claim 1, wherein the plurality of bins are arranged in horizontal rows and vertical columns, and wherein the number of horizontal rows and vertical columns is proportional to an image resolution of the image.

11. A system comprising:
one or more processors configured to perform a process comprising:
determining a subset of image descriptors from a plurality of image descriptors that each correspond to a different feature point included within an image, the subset of image descriptors determined based on geometric proximity, within the image, of respective feature points of the subset of image descriptors to a feature point of a primary image descriptor, wherein the determining the subset of image descriptors comprises:
generating a geometric map representing the plurality of image descriptors by partitioning the image into a plurality of bins;
assigning each image descriptor of the plurality of image descriptors to a respective bin of the plurality of bins; and
determining, for each particular bin of the plurality of bins that is within a search radius of a first bin to which the primary image descriptor is assigned, whether any of the plurality of image descriptors is assigned to the particular bin;
selecting a secondary image descriptor from the subset of image descriptors; and
combining the primary image descriptor and the secondary image descriptor to form a composite image descriptor.

12. The system of claim 11, wherein the process further comprises:
generating a descriptor listing that includes the plurality of image descriptors by:
accessing the image,
analyzing the image to identify feature points included within the image, and
generating, for each of the respective feature points that are identified, a respective image descriptor to be among the plurality of image descriptors included in the descriptor listing; and
identifying, from the descriptor listing, the primary image descriptor.

13. The system of claim 11, wherein the selecting of the secondary image descriptor includes:
filtering the subset of image descriptors to exclude image descriptors that:
correspond to respective feature points more than a threshold distance away from the feature point of the primary image descriptor within the image, or
are more similar to the primary image descriptor than a similarity threshold; and
designating, as the selected secondary image descriptor, a least similar image descriptor from the filtered subset of image descriptors.

14. The system of claim 11, wherein the process further comprises:
selecting one or more additional image descriptors from the subset of image descriptors; and
combining the primary image descriptor with each of the one or more additional image descriptors to form one or more additional composite image descriptors.

15. The system of claim 11, wherein the selecting of the secondary image descriptor:
includes filtering the subset of image descriptors to exclude image descriptors that correspond to respective feature points more than a threshold distance away from the feature point of the primary image descriptor within the image; and
is based on a geometric proximity between the feature point of the primary image descriptor and a feature point of the secondary image descriptor.

16. The system of claim 11, wherein the selecting of the secondary image descriptor:
includes filtering the subset of image descriptors to exclude image descriptors that are more similar to the primary image descriptor than a similarity threshold; and
is based on a similarity between the primary image descriptor and the secondary image descriptor.

17. The system of claim 11, wherein the image depicts a real-world scene and the process further comprises providing the composite image descriptor to an extended reality generation system for use in identifying one or more predetermined target objects depicted within the image.

18. The system of claim 11, further comprising generating, based on the geometric map, a proximity listing for the primary image descriptor, the proximity listing indicating the subset of image descriptors and generated by including in the proximity listing any of the plurality of image descriptors that is determined to be assigned to any of the particular bins within the search radius of the first bin.

19. The system of claim 11, wherein the plurality of bins are arranged in horizontal rows and vertical columns, and wherein the number of horizontal rows and vertical columns is proportional to an image resolution of the image.

20. A non-transitory computer-readable medium storing instructions that, when executed, direct one or more processors of a computing device to perform a process comprising:
determining a subset of image descriptors from a plurality of image descriptors that each correspond to a different feature point included within an image, the subset of image descriptors determined based on geometric proximity, within the image, of respective feature points of the subset of image descriptors to a feature point of a primary image descriptor, wherein the determining the subset of image descriptors comprises:
generating a geometric map representing the plurality of image descriptors by partitioning the image into a plurality of bins;
assigning each image descriptor of the plurality of image descriptors to a respective bin of the plurality of bins; and
determining, for each particular bin of the plurality of bins that is within a search radius of a first bin to which the primary image descriptor is assigned, whether any of the plurality of image descriptors is assigned to the particular bin;
selecting a secondary image descriptor from the subset of image descriptors; and combining the primary image descriptor and the secondary image descriptor to form a composite image descriptor.

\* \* \* \* \*